April 10, 1962 ICHIZO UCHIDA ET AL 3,029,346

PHOTOELECTRIC CIRCUIT

Filed July 8, 1960

INVENTORS
ICHIZO UCHIDA
KIMIHIKO SATAKE
BY Roy C. Hopgood
ATTORNEY

United States Patent Office 3,029,346

Patented Apr. 10, 1962

3,029,346
PHOTOELECTRIC CIRCUIT

Ichizo Uchida and Kimihiko Satake, Tokyo, Japan, assignors to Nippon Electric Company Limited, Tokyo, Japan, a corporation of Japan Filed July 8, 1960, Ser. No. 41,681
3 Claims. (Cl. 250—213)

This invention relates to a photoelectric circuit for attenuating, amplifying and/or converting radiant energy from one level or form to another, and more particularly to a circuit having a frequency response which varies with incident radiation.

Conventional photoelectric circuits of the light amplifier type generally comprise a photoconductive cell of cadmium sulfide or cadmium selenide, and an electroluminescent element connected in series with the photoconductive cell. As is well known, the impedance of such cell is predominantly resistive and varies inversely with the intensity of incident radiation. The luminosity of the electroluminescent element varies directly with the voltage thereacross. Thus, in a series circuit, as the light intensity of incident radiation increases, the voltage across the photoconductive cell decreases, thereby increasing the voltage across, and the light from the electroluminescent element. Since the photoconductive cell is predominantly resistive, the circuit suffers a substantial power loss which undesirably limits the gain of the light amplifier.

Accordingly, it is an object of this invention to provide a photoelectric circuit utilizing a photoconductive element, which accomplishes the amplification, attenuation or conversion of radiant energy without any substantial power loss in the photoconductive element.

In accordance with an aspect of this invention, there is provided a series resonant photoelectric circuit, comprising a photoconductive element whose capacitance varies as a function of the incident radiation, an electroluminescent element and an inductor. A voltage from an alternating current source of selected frequency, related to the resonant frequency, is impressed on this circuit. The current through the electroluminescent element is a function of the impedance of the circuit for the applied frequency, and the impedance is related to the capacitance of the photoconductive element which varies with the intensity of incident radiation thereon. Thus, by properly selecting the values of the resonant circuit components, and the frequency of the applied alternating current source, the circuit may be made to resonate in response to a given level of incident radiation, or alternatively, the circuit may be made to resonate in response to a given level of incident radiation, or alternatively, the circuit may be made resonant in the absence of radiation and shifted to off-resonance in response to radiation, for a reverse effect.

Figure 1:
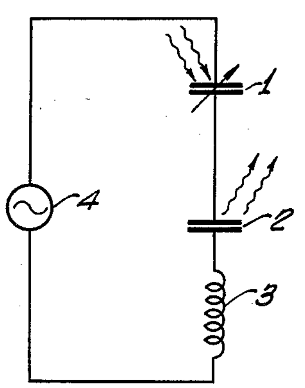
FIGURE 1 is an equivalent circuit diagram of the circuit of the invention.

Referring to FIGURE 1, a series resonant circuit comprising a photoconductive element shown as a variable capacitor, is connected to an electroluminescent element 2, shown as a fixed capacitor, and an inductor 3. The photo-conductive element may be selected from the class of materials comprising cadmium sulfide and cadmium selenide. The electroluminescent element may be selected from the class of materials comprising zinc sulfide and zinc cadmium sulfide. The capacitance of the photoconductive element varies in response to the intensity of incident radiation and of course is measurable both at maximum radiation and in the absence of radiation. The capacitance of the electroluminescent element is also predetermined. The frequency at which the circuit resonates is calculated and a source of alternating current of related frequency is connected in circuit. It is now well known that the capacitance of such photoconductive materials increases as the incident radiation increases in intensity.

The component values may be selected so that the circuit resonates in the absence of incident radiation in the photoconductive element, or alternatively, the circuit may be made to resonate in response to maximum incident radiation.

If it is desired that the electroluminescent element luminesce with increasing intensity as the incident radiation increases, then the frequency of the applied alternating current is selected so that the circuit is resonant at the capacitance value produced by maximum incident radiation.

Figure 2:
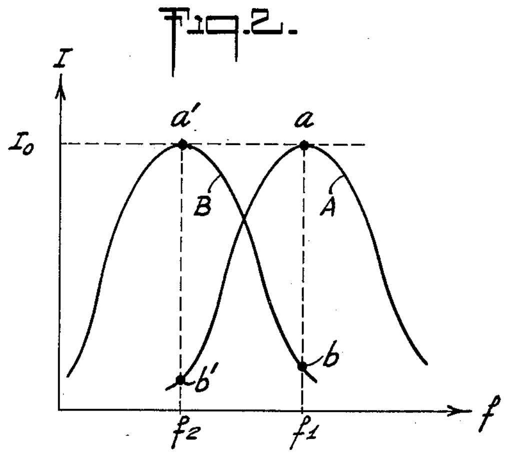
FIGURE 2 is a graphical diagram of the characteristics of operation of the circuit of FIGURE 1.

For example, in FIG. 2, the resonant frequency may be $f_2$, and in the absence of radiation the capacitance of the photoconductive element is such that the frequency response of the circuit is at *b*, whereby only a small current flows through the circuit causing the electroluminescent element to produce little or no light. As the radiation increases, thereby increasing the capacitance of the photoconductive element, the frequency response shifts until it corresponds to the applied frequency at point *a'* which is the resonant frequency of the circuit. Maximum current flows at this frequency causing the electroluminescent element to luminesce with maximum intensity and greatly amplifying the intensity of incident radiation.

The circuit may also produce a reversal effect by producing maximum luminescense in the absence of radiation and decreasing in intensity as the radiation increases. Referring again to FIG. 2, the applied frequency may be selected so that the circuit is resonant for that value of photoconductive capacitance produced by the absence of incident radiation; e.g. point *a*. As radiation is applied to the photoconductive element, its capacitance is increased so that the frequency response is shifted off resonance. At maximum incident radiation the frequency response is at *b'*; the current in the circuit being small, causing little or no luminescense.

In the first described method of operation the circuit is an amplifier of the incident radiation which may be light, or alpha, beta or gamma rays. In the second method, the circuit is an alternator. If one of the invisible rays is applied to the photoconductive element, the circuit then serves to amplify or attenuate, and converts the energy into light energy.

As a result of utilizing the frequency response of the circuit, the Q of the circuit may be selected to give a very high light amplification factor and selectivity.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. A photoelectric circuit comprising a series resonant circuit including a photoconductive element whose capacitance varies in response to incident radiation, an electroluminescent element having a predetermined capacitance, an inductor, and a source of alternating current of preselected frequency, the circuit being adapted to resonate at said preselected frequency in response to a predetermined level of radiation incident on said photoconductive element and being adapted to shift off resonance as the level of incident radiation varies from said predetermined level thereof, whereby said electroluminescent element luminesces with maximum intensity in response to said predetermined level of radiation incident on said photoconductive element and reduces its intensity of luminescence as the level of incident radiation varies from said predetermined level thereof.

2. The circuit according to claim 1, wherein said circuit is adapted to resonate at said preselected frequency in response to maximum incident radiation on said photoconductive element and to shift off resonance when the incident radiation decreases.

3. The circuit according to claim 1, wherein said circuit is adapted to resonate at said preselected frequency in response to minimum incident radiation on said photoconductive element, and to shift off resonance when the incident radiation increases.

References Cited in the file of this patent

UNITED STATES PATENTS 2,904,696 Elliott et al. ........... Sept. 15, 1959
2,909,667 Orthuber et al. ......... Oct. 20, 1959